US009033650B2

(12) United States Patent
Lee

(10) Patent No.: US 9,033,650 B2
(45) Date of Patent: May 19, 2015

(54) VARIABLE BLADE TYPE TIDAL AND WIND POWER GENERATOR WITH INCREASED GENERATION EFFICIENCY

(71) Applicant: In-Nam Lee, Namyangju-si (KR)

(72) Inventor: In-Nam Lee, Namyangju-si (KR)

( * ) Notice: Subject to any disclaimer, the term of this patent is extended or adjusted under 35 U.S.C. 154(b) by 0 days.

(21) Appl. No.: 14/154,324

(22) Filed: Jan. 14, 2014

(65) Prior Publication Data
US 2015/0091303 A1 Apr. 2, 2015

(30) Foreign Application Priority Data
Oct. 1, 2013 (KR) .......................... 10-2013-0117283

(51) Int. Cl.
| F03D 3/00 | (2006.01) |
| F03B 3/14 | (2006.01) |
| F03B 13/26 | (2006.01) |
| F03B 13/10 | (2006.01) |
| F03D 9/00 | (2006.01) |
| F03D 3/06 | (2006.01) |

(52) U.S. Cl.
CPC ................. *F03B 3/145* (2013.01); *F03B 13/26* (2013.01); *F03B 13/10* (2013.01); *F03D 3/005* (2013.01); *F03D 9/002* (2013.01); *F03D 3/068* (2013.01)

(58) Field of Classification Search
CPC ....................................................... F03D 3/00
USPC .............................................. 415/2.1; 290/55
See application file for complete search history.

(56) References Cited

U.S. PATENT DOCUMENTS

| 1,111,350 | A | * | 9/1914 | Bayley ......................... 416/117 |
| 1,467,962 | A | * | 9/1923 | Twiford ......................... 416/98 |
| 1,626,313 | A | * | 4/1927 | Tuckey ........................ 416/118 |
| 4,818,180 | A | * | 4/1989 | Liu ............................... 416/117 |
| 4,832,569 | A | * | 5/1989 | Samuelsen et al. ............. 416/17 |
| 6,857,846 | B2 | * | 2/2005 | Miller ........................... 415/4.2 |
| 6,942,454 | B2 | * | 9/2005 | Ohlmann ...................... 416/11 |
| 6,984,899 | B1 | * | 1/2006 | Rice .............................. 290/44 |
| 8,459,949 | B2 | * | 6/2013 | Lee .............................. 416/117 |
| 2007/0212225 | A1 | * | 9/2007 | Vanderhye ............... 416/197 A |
| 2009/0146432 | A1 | * | 6/2009 | Ballena .......................... 290/55 |
| 2013/0195636 | A1 | * | 8/2013 | Poole ............................ 415/203 |

* cited by examiner

*Primary Examiner* — Joseph Waks
(74) *Attorney, Agent, or Firm* — Birch, Stewart, Kolasch & Birch, LLP

(57) ABSTRACT

Disclosed herein is a variable blade type tidal and wind power generator with increased generation efficiency. The tidal and wind power generator includes an installation frame (10), a vertical rotating shaft (20), blade installation bars (30) and (30'), support rings (40) and (40'), vertical support rods (50); rotor blades (60) and (60'), vertical support frames (70), horizontal frames (80), an installation member (20'), a support wire (50'), a blade-spreading-degree control means (90), a generation efficiency enhancing means (100) and a generation means (200) which is coupled to the lower end of the vertical rotating shaft to generate power. The tidal and wind power generator can be operated even in conditions of gentle winds or low tides regardless of the direction of the wind or the tidal flow.

10 Claims, 19 Drawing Sheets

VARIABLE BLADE TYPE TIDAL AND WIND POWER GENERATOR WITH INCREASED GENERATION EFFICIENCY

BACKGROUND OF THE INVENTION

1. Field of the Invention

The present invention relates generally to tidal and wind power generators which can be used not only as tidal power generators but also as wind power generators and, more particularly, to a variable blade type tidal and wind power generator with increased generation efficiency which includes rotor blades configured such that each rotor blade is spread at a first side at which it receives the wind, and is folded at a second side spaced apart from the first side at an angle of 180° so that, when the rotor blade is rotating, air resistance can be minimized and the wind can be collected by the rotor blades, and which is configured in such a way that the number of generation units operated to generate electricity is changed depending on the magnitude of the wind, whereby the generation efficiency can be further enhanced, and which is able to be easily installed regardless of installation place and is configured such that a plurality of wind power generators are stably and reliably installed even in a comparatively small space by a simple method, whereby the power production per a unit area can be maximized, so that the generator can be easily industrialized.

2. Description of the Related Art

Generally, power generation methods which are now in use include thermal power generation which uses a large amount of fossil fuel, nuclear power generation which uses uranium, water power generation which requires a large scale of plain freshwater equipment, etc. Such power generation methods are major contributors to air pollution or global warming, create intractable radioactive waste, or cause severe destruction to the environment. Therefore, more environmentally friendly power generation methods are urgently required. As representative examples of such substitute environmentally friendly power generation methods, solar power generation and wind power generation are widely being studied. Particularly, recently, wind power generation which uses the force of the wind is most preferred. In Korea which is surrounded by water on three sides, interest in wind power generation is largely increasing.

Wind power generation which uses the force of the wind is a technology which uses the aerodynamic characteristics of kinetic energy of flowing air and rotates a rotor to convert the energy into mechanical energy, thus producing power. Wind power generators are classified into a horizontal type and a vertical type according to a direction of a rotating shaft with respect to the ground. Such a wind power generator includes a rotor which has a hub and blades, an accelerating unit which accelerates the rotor and operates the generation unit, a control unit which controls the generation unit and different kinds of safety devices, a hydraulic brake unit, a power control unit and a steel tower.

Furthermore, wind power generation is a new energy generation technology which has a minimal effect on the environment because it uses nonpolluting, ubiquitous and infinite wind as the energy source, and it makes it possible to efficiently use the territory and to compete with existing power generation methods in power generation cost if a large power generation complex is constructed.

Such a wind power generator converts kinetic energy of a rotor which is rotating into electric energy. Here, in theory, about 60% of kinetic energy of the wind is converted into mechanical energy, and much energy loss is also caused during a process of converting the mechanical energy into electric energy. Therefore, efficiency in conversion of the energy of the wind into electric energy is merely 20% to 40%, although it slightly varies depending on the shape of the rotor.

The conventional wind power generator is problematic in that only when the speed of the wind is higher than a predetermined value and the density of air is comparatively high can the rotor be rotated by kinetic energy of the wind transmitted to the rotor blades so that the rotor rotates to convert the kinetic energy of the wind into electric energy.

In other words, in the conventional wind power generator, if the wind blows lightly, the rotating force of the rotor is greatly reduced, and it may be impossible to generate electricity.

Particularly, in the case of the conventional wind power generator, when each rotor blade rotates by 180° from a side at which it receives the wind, the rotor blade acts to impede the rotation of the rotor because of resistance of the wind. Thereby, the generation efficiency is further reduced.

In an effort to overcome the above-mentioned problems, a rotor having variable blades for wind power generators was proposed in Korean Patent Registration No. 0966523.

As shown in FIGS. 1 and 2, the rotor having variable blades for wind power generators of No. 0966523 includes: a casing 110 which is coupled to a rotating shaft of a generator and is rotated along with the rotating shaft; blades 120 which are provided around the casing 110 at positions spaced apart from each other with respect to the circumferential direction and the longitudinal direction at regular intervals so as to rotate the casing 110 using the force of the wind and are spread or folded by the force of the wind; brackets 131 to which the blades 120 are rotatably mounted by hinges, and which are installed on the casing 110; and drive units 130 which are installed on the casing 110, and to which the blades 120 are rotatably mounted. The drive units 130 operate the corresponding blades 120 in such a way that the blades 120 are spread or folded depending on the direction in which the blades 120 receive the wind. Each drive unit 130 includes: a bracket 131 which is installed on the casing 110, and to which the corresponding blades 120 are rotatably coupled by hinges H; a cylinder 133 which is installed on the bracket 131 and defines an operation space 133a therein; a piston 135 which is disposed in the operation space 133a and linearly reciprocates; a compression spring 137 which is disposed in the operation space 133a to elastically bias the piston 135 towards the blades 120; and links 139 each of which is connected at a first end thereof to the corresponding blade 120 and is connected at a second end thereof to the piston 135. While the rotor 100 rotates, when front surfaces 121 of the blades 120 face the wind, the blades 120 are spread. When rear surfaces 123 of the blades 120 face the wind, the blades 120 are rapidly rotated on the bracket 131 and folded by the wind power and the elastic force of the compression spring 137 so that wind power applied to the blades 120 can be reduced. In this way, the rotating force of the rotor 100 can be increased.

Although the rotor 100 having variable blades for wind power generators of No. 0966523 is configured such that the blades 120 are spread or folded by the wind, because the blades 120 which have been in the spread or folded state are converted into the other state when they are rotated around the casing 110 by 180°, there is the possibility of the blades 120 being not reliably spread or folded. Further, because the elastic force of the compression spring 137 which folds the blades 120 acts as force to impede the rotation of the rotor 100, the generation efficiency of the generator is not enhanced as expected.

Furthermore, the rotor 100 having variable blades for wind power generators of No. 0966523 does not have a separate means for making repair or maintenance possible without stopping the rotor 100. Thus, repair or maintenance of the rotor 100 cannot be easily performed. That is, even if any of the blades 120 malfunctions, because the rotor 100 is continuously rotating, it is not easy to repair the malfunctioning blade 120 after interrupting the operation of the rotor 100.

In addition, the conventional wind power generator uses a single turbine to generate power regardless of the magnitude of the wind. Thus, even if the magnitude of the wind is largely increased, the generation quantity cannot be increased over a predetermined level.

SUMMARY OF THE INVENTION

Accordingly, the present invention has been made keeping in mind the above problems occurring in the prior art, and an object of the present invention is to provide a variable blade type tidal and wind power generator which can be operated even in conditions of gentle winds or low tides regardless of the direction of the wind or the tidal flow, and in which rotor blades are configured in such a way that they can collect wind or tidal power, thus enhancing the generation efficiency.

Another object of the present invention is to provide a variable blade type tidal and wind power generator in which each rotor blade is spread at a side at which it receives the wind or tidal power, and when the rotor blade rotates by 180°, is folded to minimize air or water resistance when rotating, thus minimizing resistance force that affects the rotating force of a rotor shaft, thereby enhancing the generation efficiency.

A further object of the present invention is to provide a variable blade type tidal and wind power generator which has a simple structure, so that it can be easily manufactured, and is configured such that a plurality of generators can be installed at various places without site limitation, thus making it possible to maximize power production per unit area, whereby the wind power generator can be easily industrialized, and which can produce electricity without environmental pollution due to, for example, greenhouse gas exhaustion.

Yet another object of the present invention is to provide a variable blade type tidal and wind power generator which is configured such that even when wind power generators or tidal power generators are constructed in a multi-story structure, they can be stably and reliably installed, and as needed, the rotation of the rotor blade may be easily stopped in a simple way, whereby a worker can access a portion of the rotor blade that is required to be repaired, thus facilitating the maintenance.

Still another object of the present invention is to provide a variable blade type tidal and wind power generator which is configured such that when the rotor blades rotates, the center of resistance force is dispersed, whereby the generator is formed of light material, thus reducing the cost of equipment, so that the generator is economically feasible.

In order to accomplish the above object, the present invention provides a variable blade type tidal and wind power generator with increased generation efficiency, including: an installation frame (10) having a '+'-shaped structure and placed on a base surface, with a vertical-rotating-shaft support bracket provided on a central portion of the installation frame (10); a vertical rotating shaft (20) rotatably provided upright in the central portion of the installation frame (10); a plurality of blade installation bars (30) and (30') crossing upper and lower portions of the vertical rotating shaft (20) in directions perpendicular to the vertical rotating shaft (20), the blade installation bars (30), (30') being spaced apart from each other at regular angular intervals; a plurality of support rings (40) and (40') each of which connects ends of the corresponding blade installation bars (30), (30') to each other; a plurality of vertical support rods (50) respectively connect the ends of the corresponding upper and lower blade installation bars (30) and (30') to each other; a plurality of rotor blades (60) and (60') installed between the blade installation bars (30) and (30') by means of brackets; a plurality of vertical support frames (70) installed upright on outer ends of the installation frame (10); a plurality of horizontal frames (80) connected to upper ends of the respective vertical support frames (70); a support wire (50') connecting an installation member (20') provided on an upper end of the vertical rotating shaft (20) to the ends of the blade installation bars (30) so as to support the blade installation bars (30); a blade-spreading-degree control means (90) provided under lower surfaces of the blade installation bars (30'), the blade-spreading-degree control means (90) controlling angles at which the rotor blades (60) and (60') spread; a generation efficiency enhancing means (100) provided under a central portion of the installation frame (10), the generation efficiency enhancing means (100) for changing the number of turbines operating to generate electricity depending on a magnitude of wind; and a generation means (200) provided under a lower end of the vertical rotating shaft (20), the generation means (200) for generating electricity.

BRIEF DESCRIPTION OF THE DRAWINGS

The patent or application file contains at least one color drawing. Copies of this patent or patent application publication with color drawing will be provided by the USPTO upon request and payment of the necessary fee.

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a variable blade type tidal and wind power generator with increased generation efficiency according to a preferred embodiment of the present invention will be described in detail with reference to the attached drawings.

Figure 1:
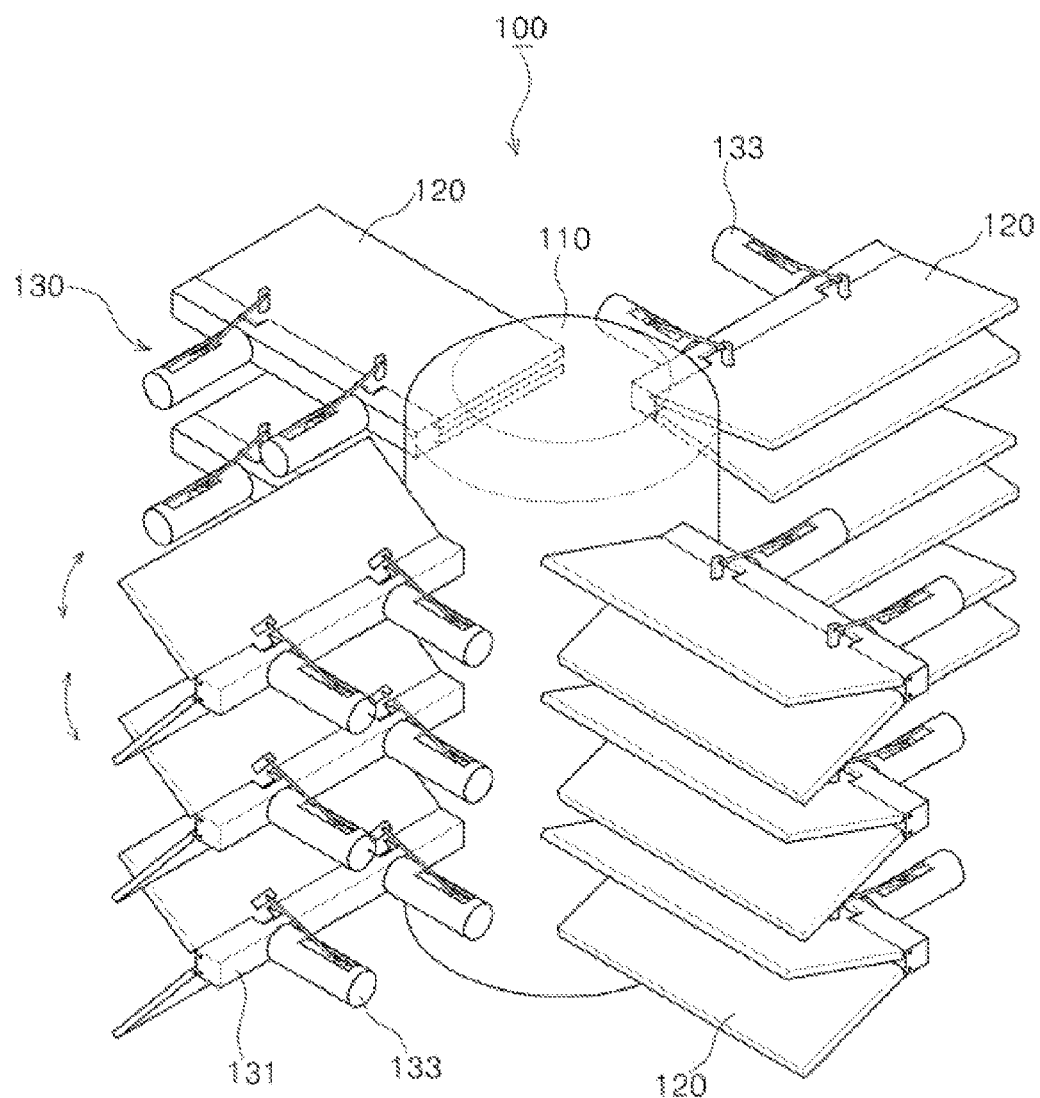
FIG. 1 is a perspective view illustrating the construction of a conventional rotor having variable blades for wind power generators.
Figure 2:
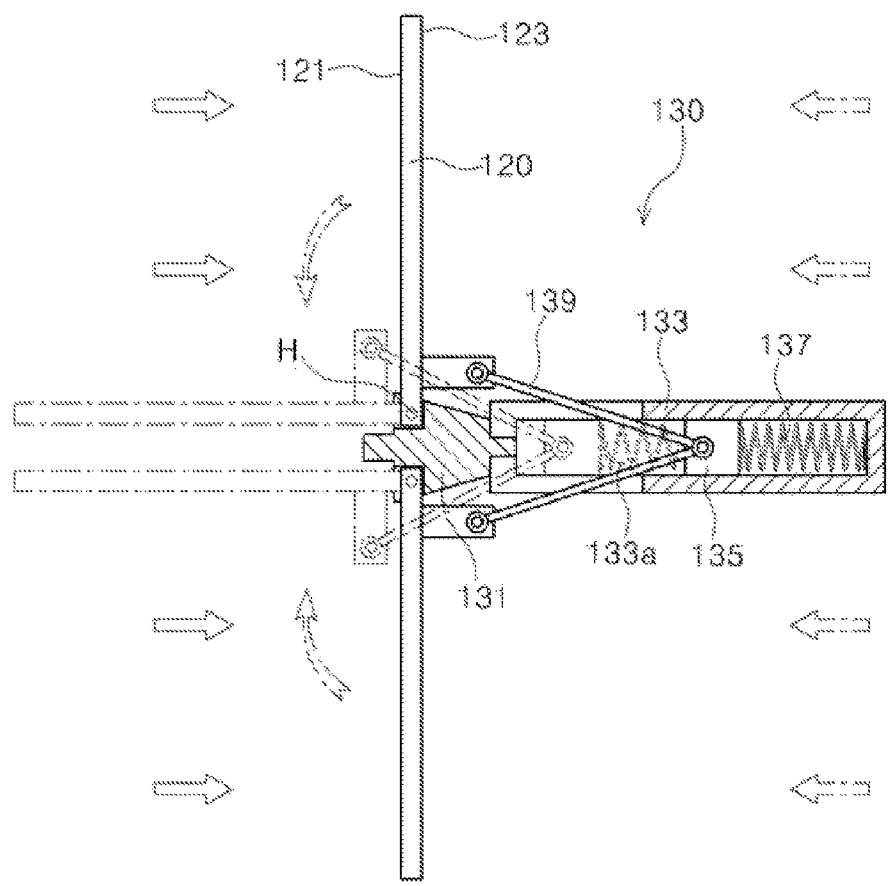
FIG. 2 is a sectional view showing the construction of blades and a drive unit which are installed on the conventional rotor for wind power generators.
Figure 3:
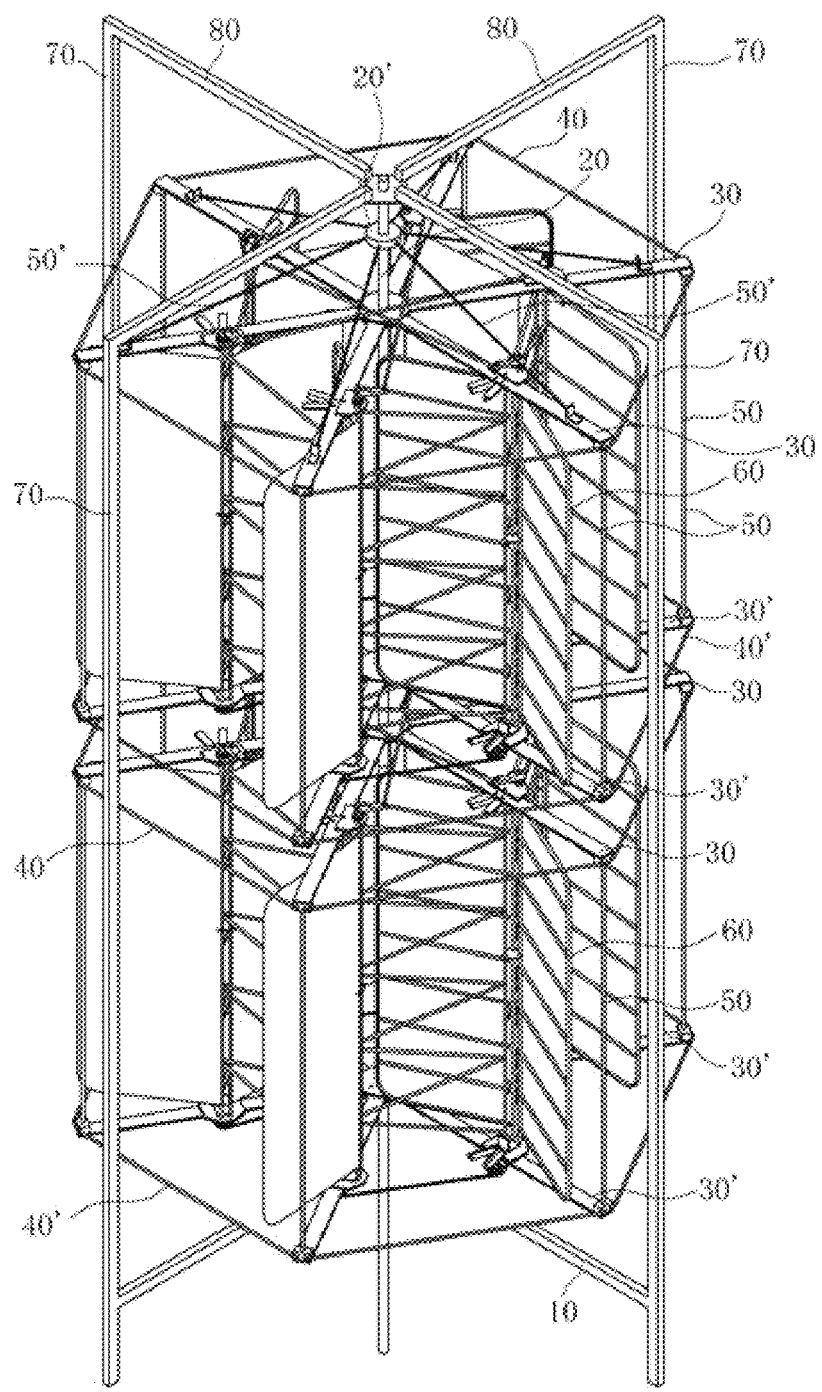
FIG. 3 is a perspective view of a variable blade type tidal and wind power generator with increased generation efficiency, according to the present invention.
Figure 4:
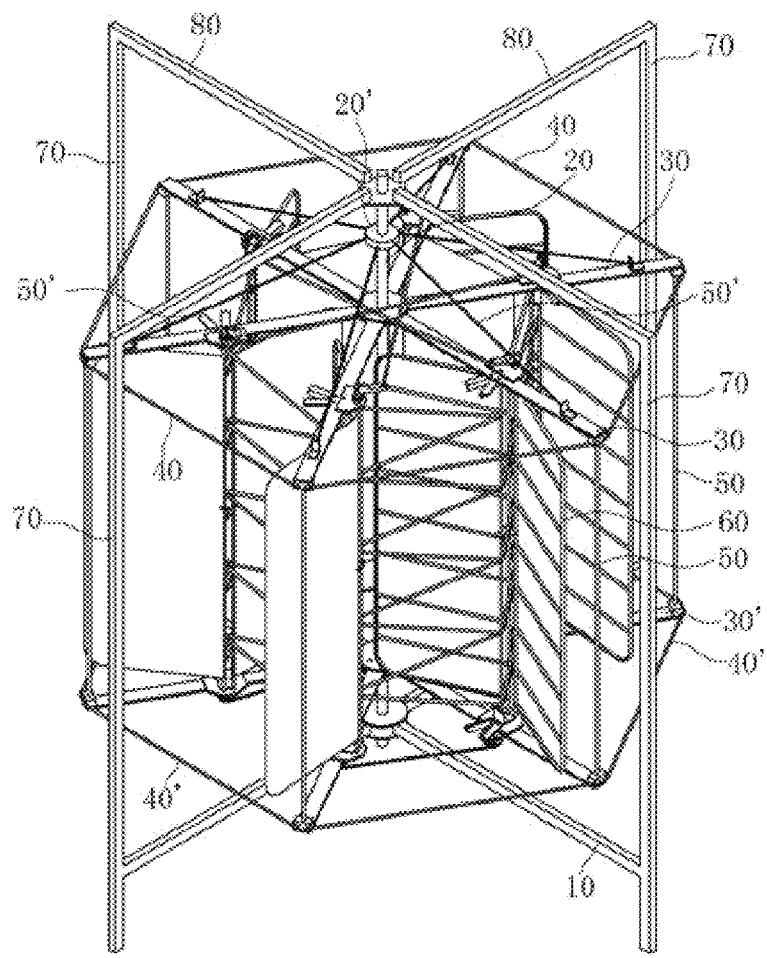
FIG. 4 is a view showing conditions of rotor blades of the tidal and wind power generator which are installed on the same plane according to the present invention.
Figure 5:
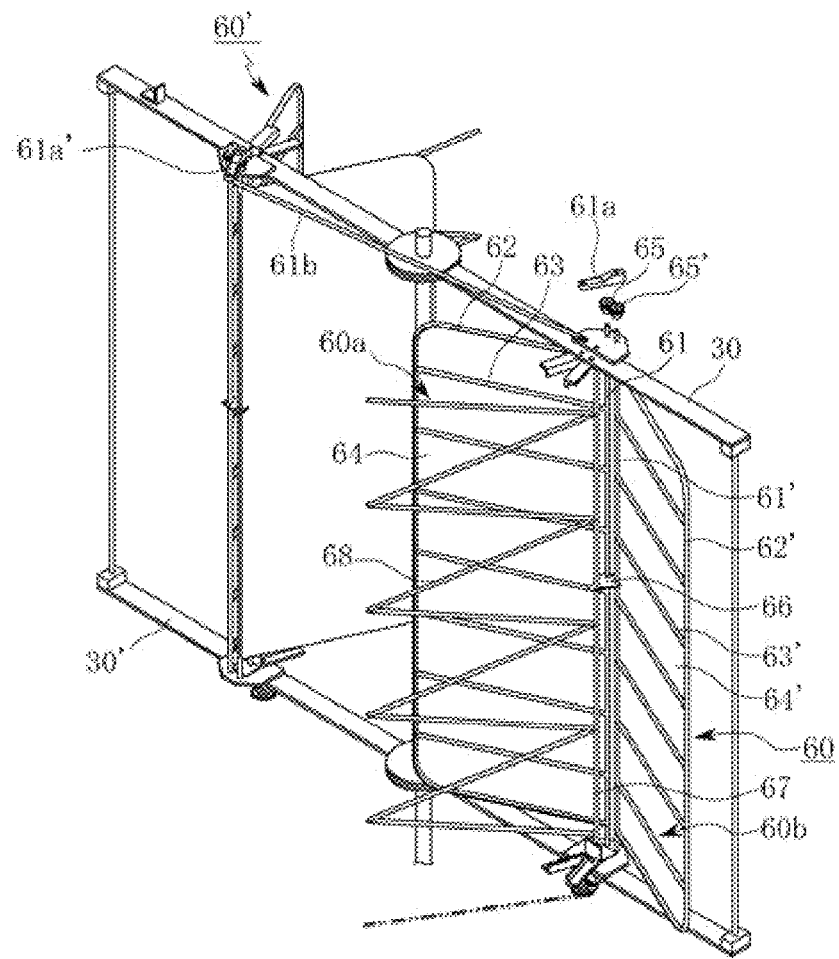
FIG. 5 is a perspective view showing installation conditions of rotor blades according to the present invention.
Figure 6:
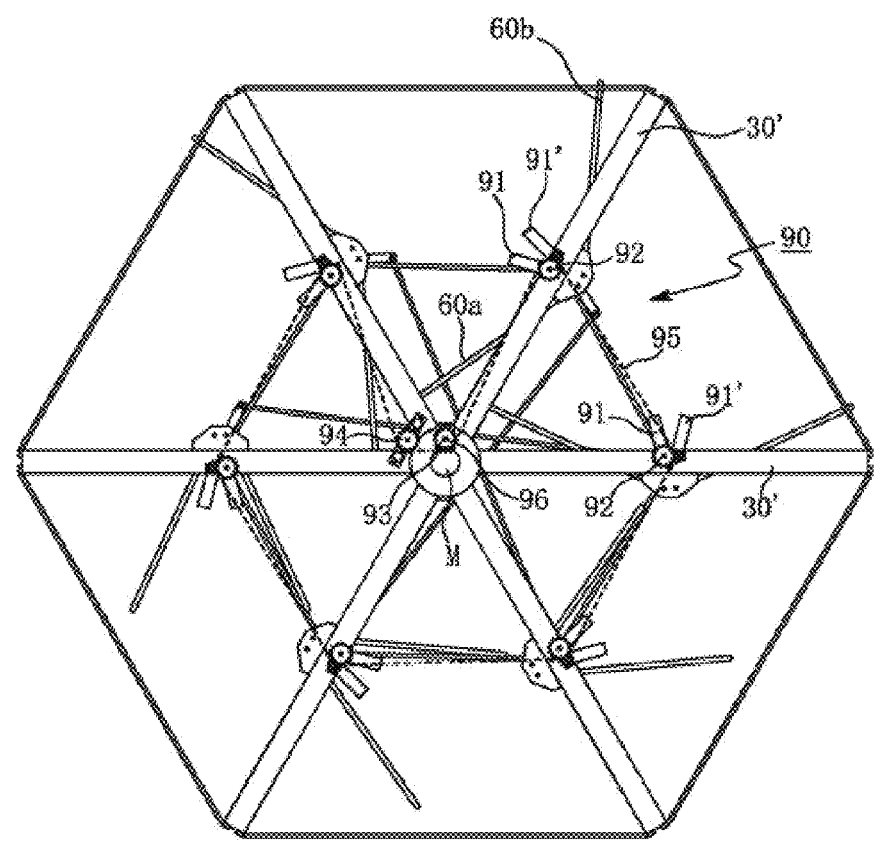
FIG. 6 is a bottom view illustrating the tidal and wind power generator according to the present invention.
Figure 7:
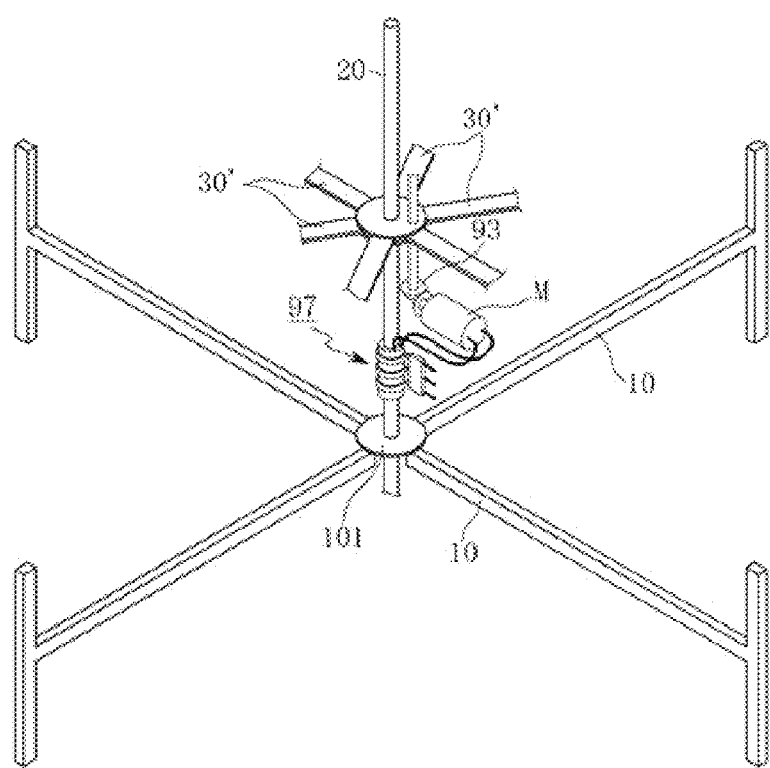
FIG. 7 is a perspective view showing a blade-spreading-degree control means according to the present invention.
Figure 8A:
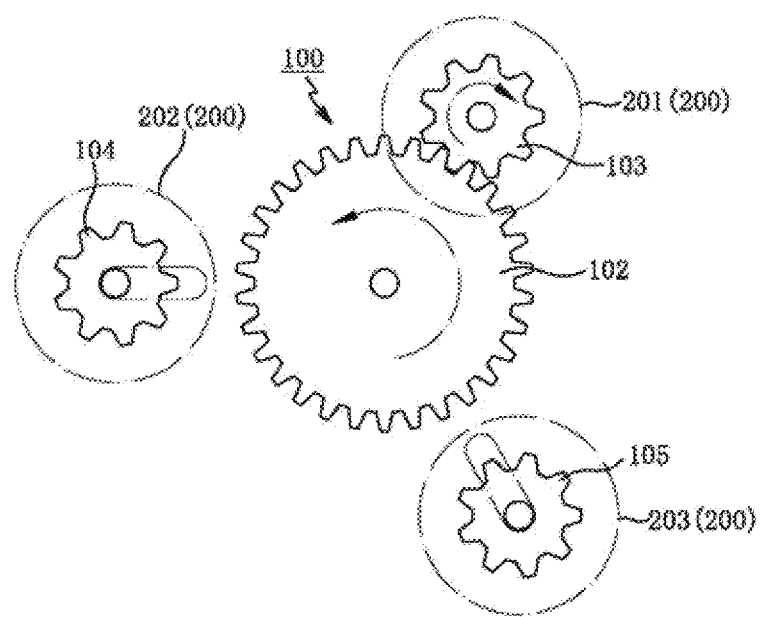
FIGS. 8A through 8C are plan views showing arrangement of gears of a generation efficiency enhancing means according to the present invention.
Figure 8B:
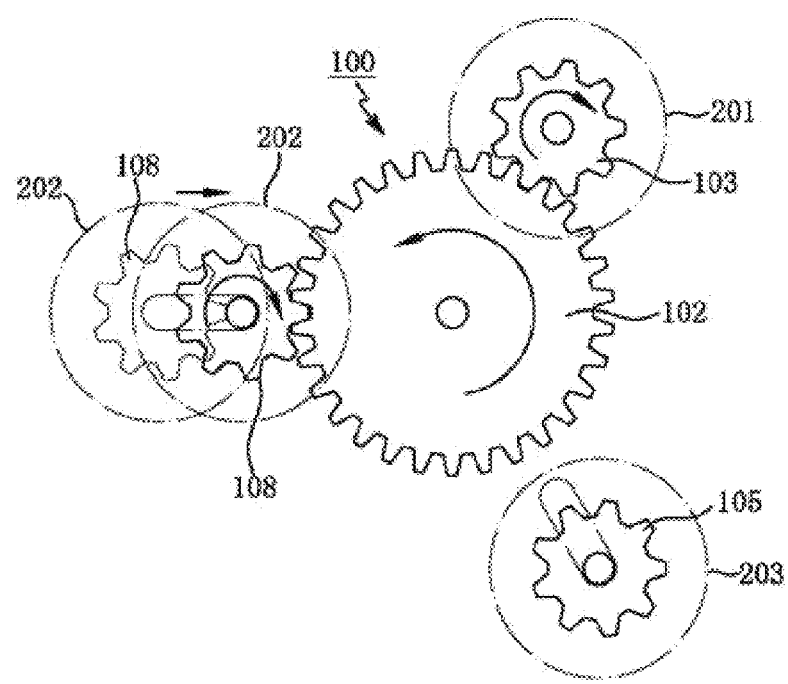
Figure 8C:
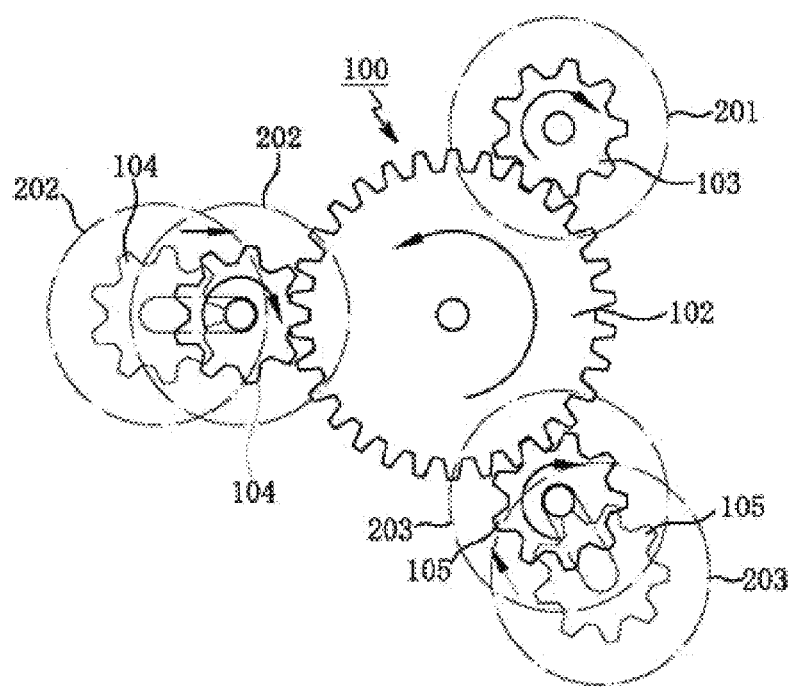
Figure 9:
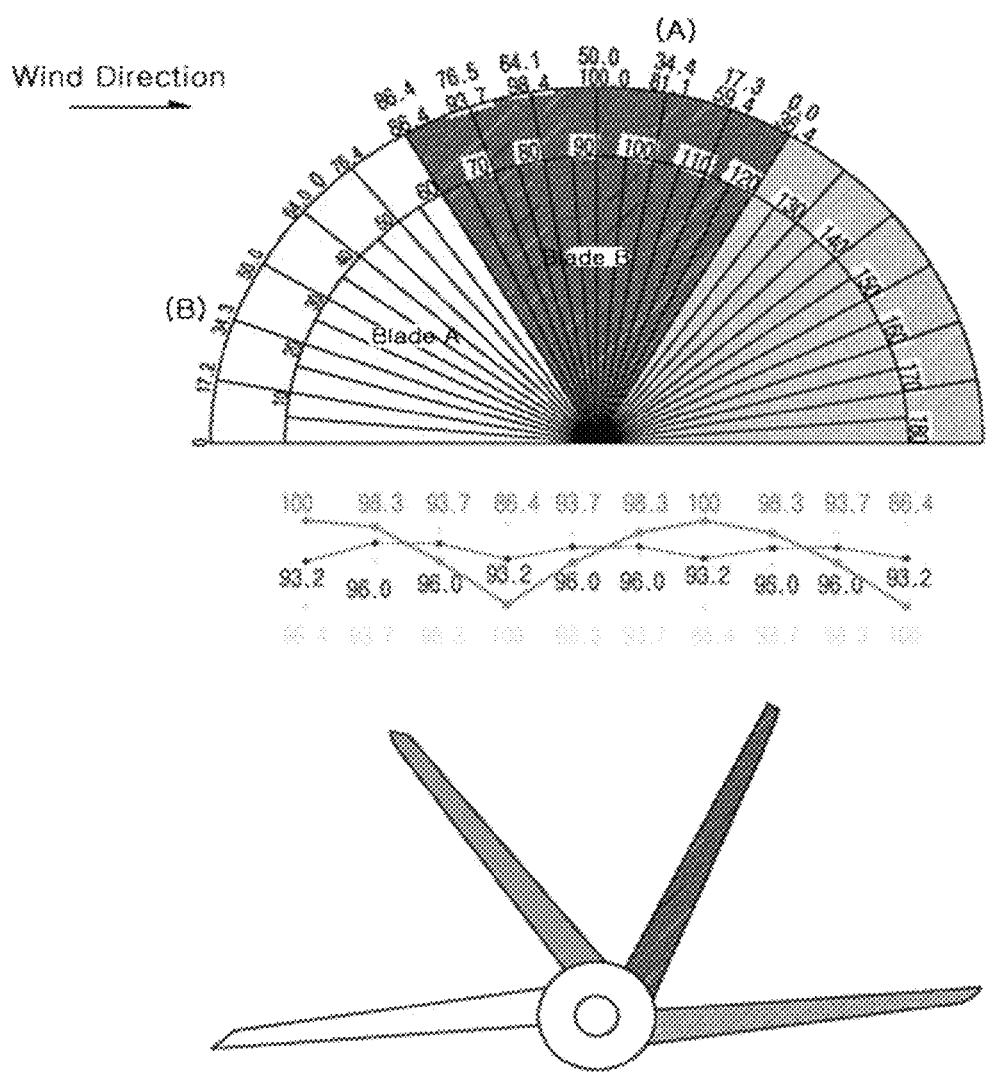
FIG. 9 is a graph showing the energy efficiency of the tidal and wind power generator according to the present invention.
Figure 10:
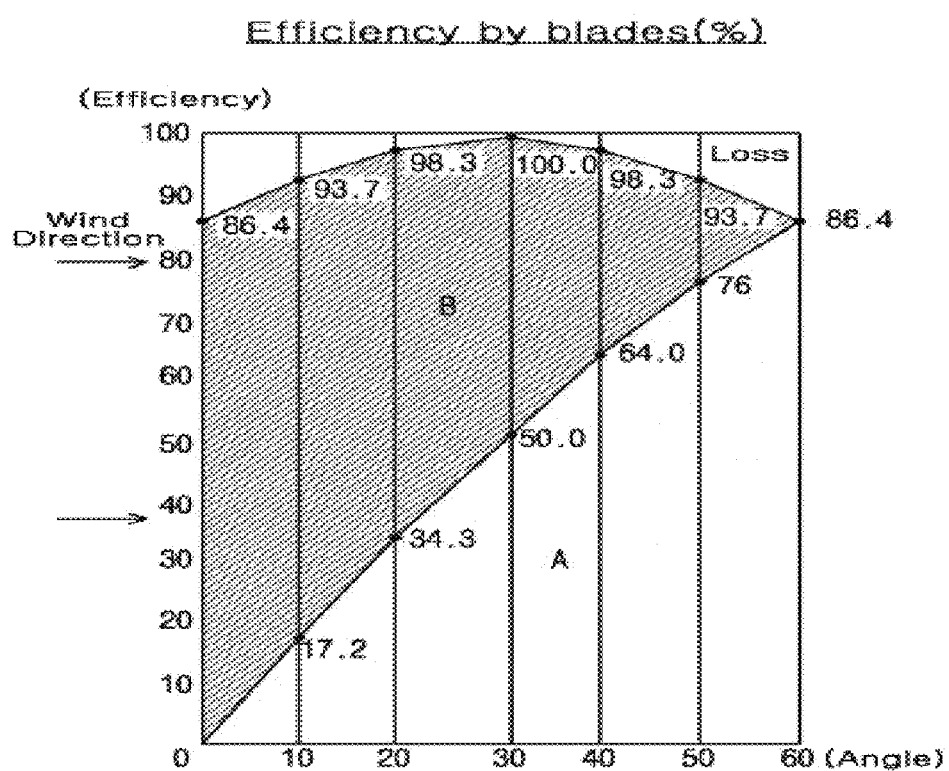
FIG. 10 is a graph showing the energy efficiency by blades.
Figure 11A:
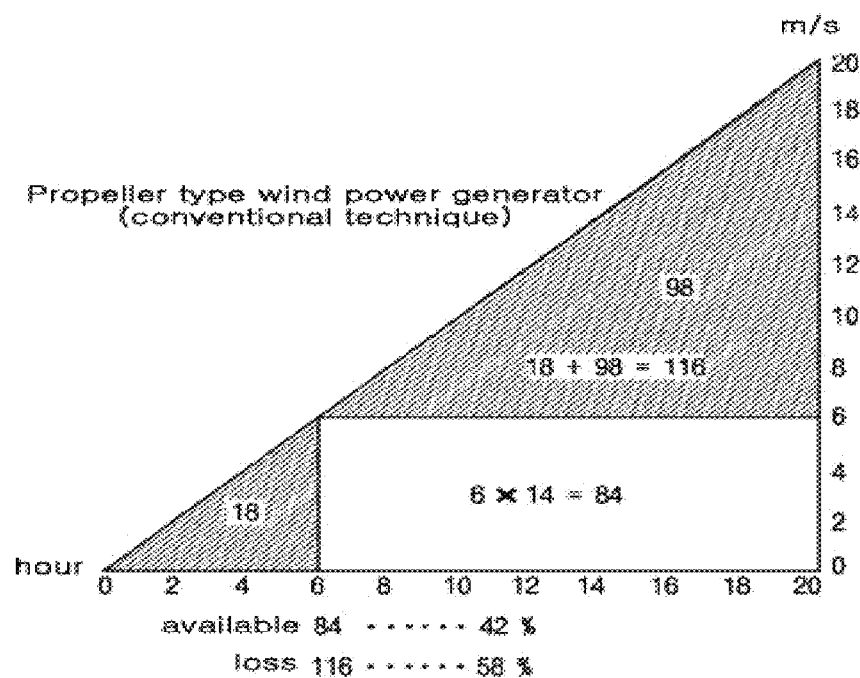
FIG. 11A is a graph showing the generation efficiency of the conventional wind power generator as a function of wind speed.
Figure 11B:
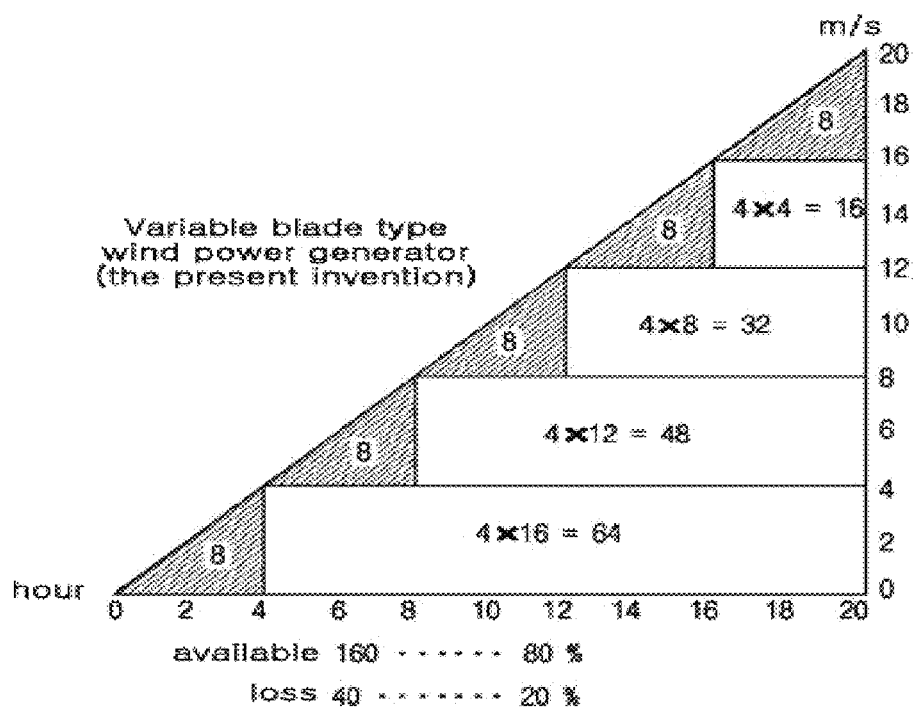
FIG. 11B is a graph showing the generation efficiency of the tidal and wind power generator according to the present invention as a function of wind speed.
Figure 12:
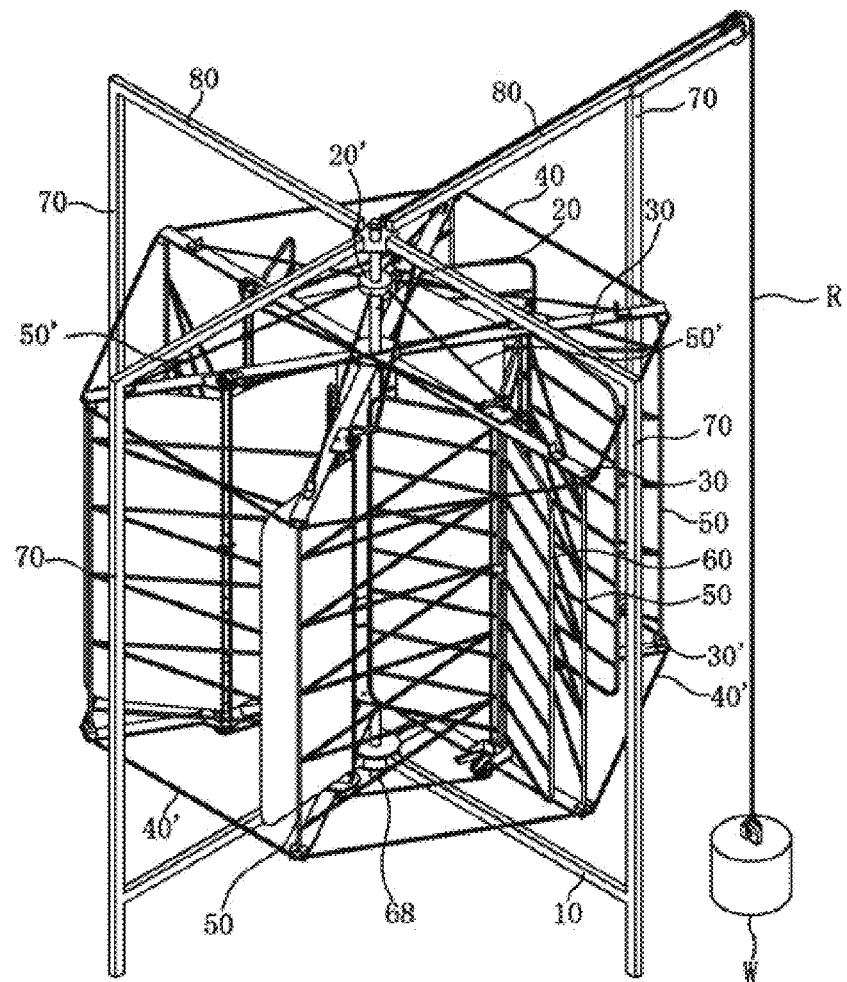
FIG. 12 is a view illustrating a process of measuring the intensity of rotating force of the wind power generator according to the present invention as a function of wind speed.
Figure 13:
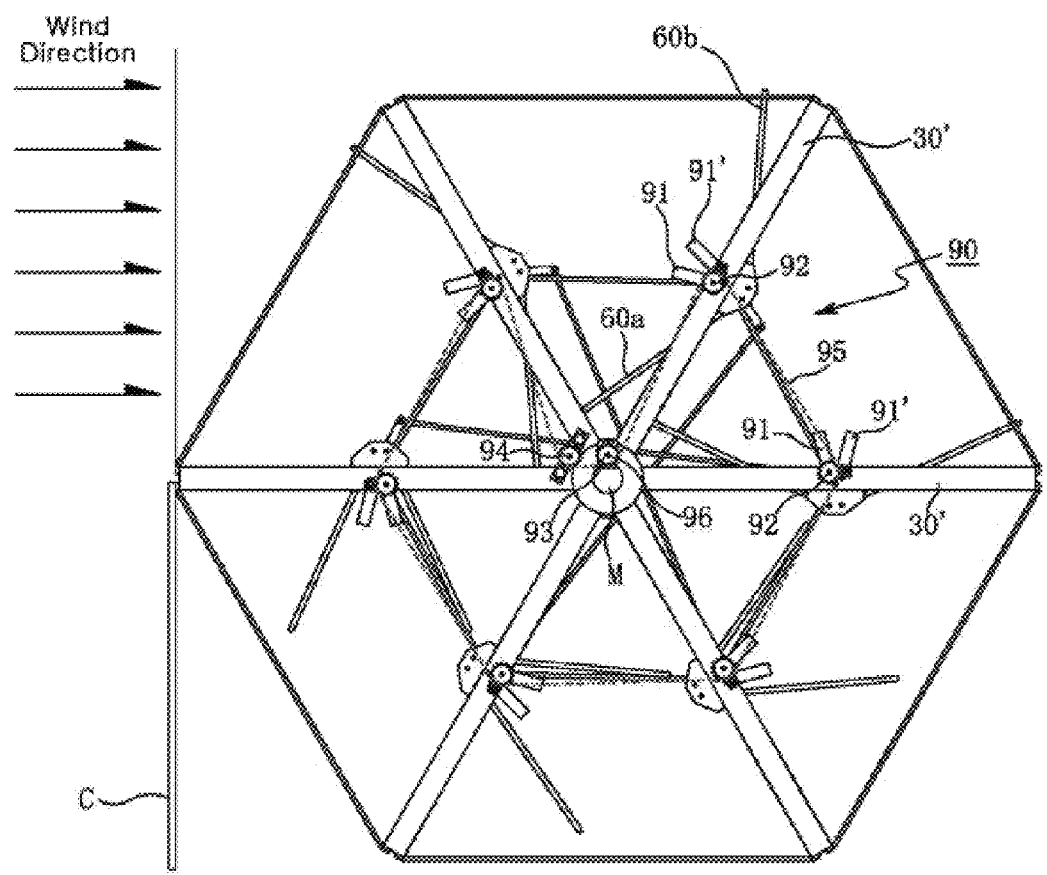
FIG. 13 is a view showing a test in which a side at which the rotor blades are folded is blocked with a blocking panel and the wind is applied to the generator according to the present invention.
Figure 14:
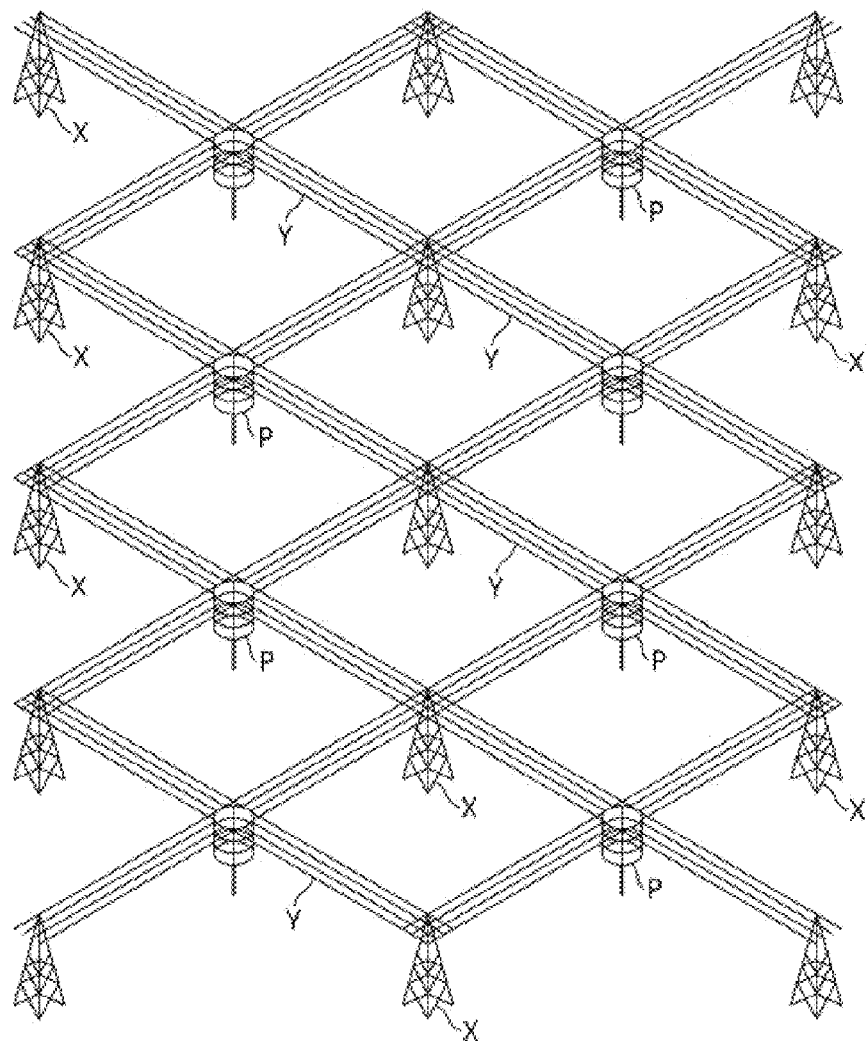
FIG. 14 is a schematic view showing a plurality of tidal and wind power generators installed at positions spaced apart from each other with respect to the horizontal direction at regular intervals according to the present invention.
Figure 15:
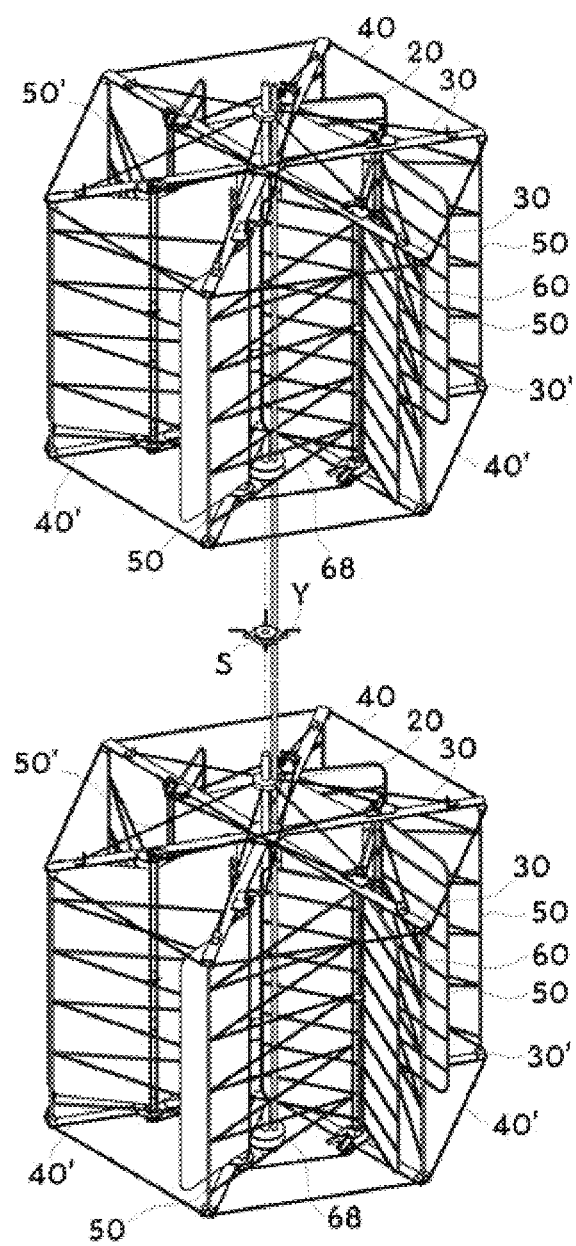
FIG. 15 is a view illustrating a support unit interposed between upper and lower wind power generators so that the wind power generators are supported by wires according to the present invention.
Figure 16:
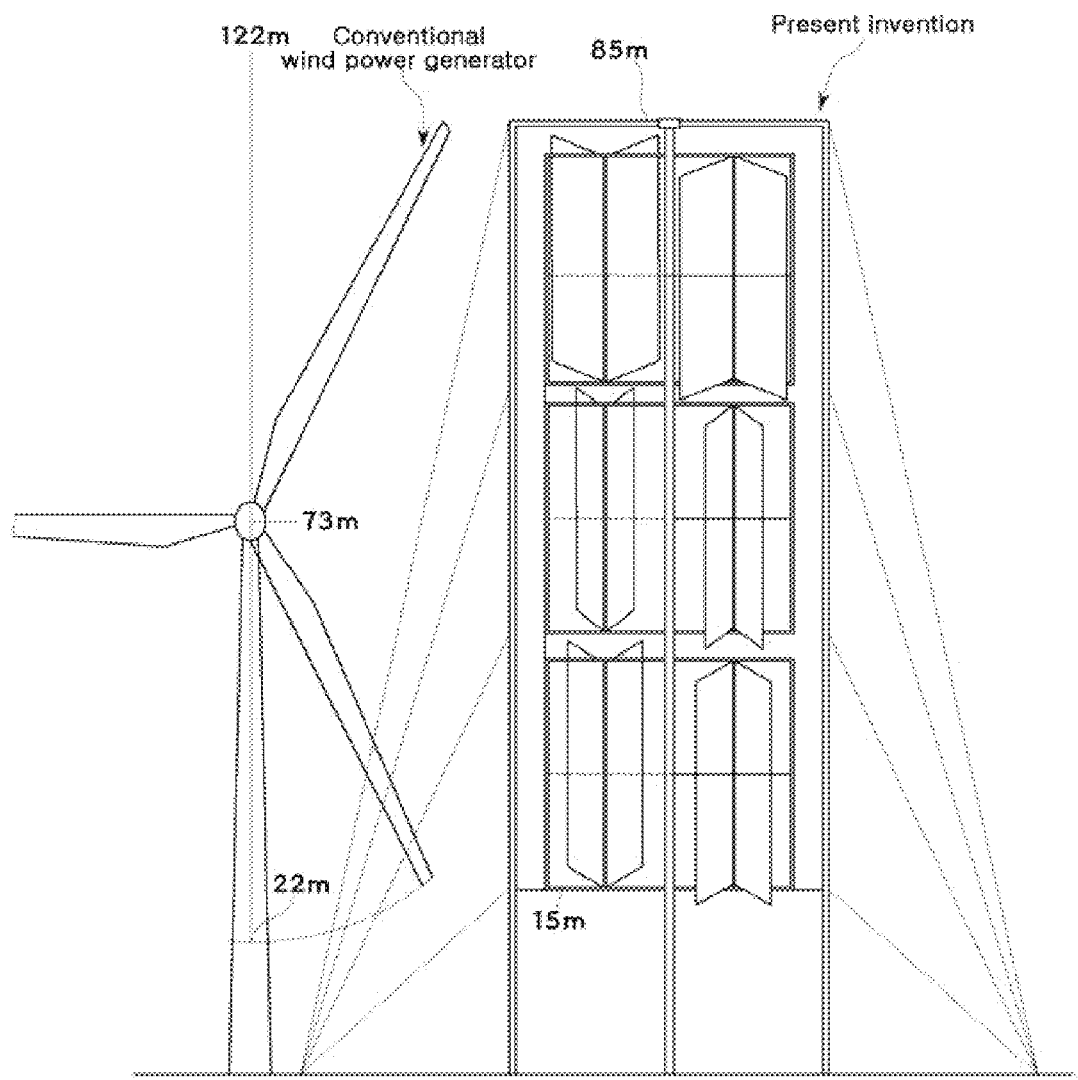
FIG. 16 is a view comparing installation conditions of the rotor blades of the wind power generator of the present invention to that of the conventional wind power generator.

FIG. 3 is a perspective view of a variable blade type tidal and wind power generator with increased generation efficiency, according to the present invention. FIG. 4 is a view showing conditions of rotor blades of the tidal and wind power generator which are installed on the same plane according to the present invention. FIG. 5 is a perspective view showing installation conditions of rotor blades according to the present invention. FIG. 6 is a bottom view illustrating the tidal and wind power generator according to the present invention. FIG. 7 is a perspective view showing a blade-spreading-degree control means according to the present invention. FIGS. 8A through 8C are plan views showing arrangement of gears of a generation efficiency enhancing means according to the present invention. FIG. 9 is a graph showing the energy efficiency of the tidal and wind power generator according to the present invention. FIG. 10 is a graph showing the energy efficiency by blades. FIG. 11A is a graph showing the generation efficiency of the conventional wind power generator as a function of wind speed. FIG. 11B is a graph showing the generation efficiency of the tidal and wind power generator according to the present invention as a function of wind speed. FIG. 12 is a view illustrating a process of measuring the intensity of rotating force of the wind power generator according to the present invention as a function of wind speed. FIG. 13 is a view showing a test in which a side at which the rotor blades are folded is blocked with a blocking panel and the wind is applied to the generator according to the present invention. FIG. 14 is a schematic view showing a plurality of tidal and wind power generators installed at positions spaced apart from each other with respect to the horizontal direction at regular intervals according to the present invention. FIG. 15 is a view illustrating a support unit interposed between upper and lower wind power generators so that the wind power generators are supported by wires according to the present invention. FIG. 16 is a view comparing installation conditions of the rotor blades of the wind power generator of the present invention to that of the conventional wind power generator. The variable blade type tidal and wind power generator according to the present invention includes: an installation frame 10 which has a '+'-shaped structure and is placed on the ground and provided with a vertical-rotating-shaft support bracket on a central portion thereof; a vertical rotating shaft 20 which is rotatably provided upright in the central portion of the installation frame 10; a plurality of blade installation bars and 30' which cross upper and lower portions of the vertical rotating shaft 20 in directions perpendicular to the vertical rotating shaft 20 and are arranged around the vertical rotating shaft 20 at positions spaced apart from each other at regular angular intervals; support rings 40 and 40'each of which connects ends of the corresponding blade installation bars 30, 30' to each other; vertical support rods 50 which connect the ends of the corresponding upper and lower blade installation bars 30 and 30' to each other; rotor blades 60 and 60' which are installed between the blade installation bars 30 and 30' by means of brackets; a plurality of vertical support frames 70 which are installed upright on outer ends of the installation frame 10; a plurality of horizontal frames 80 which are connected to upper ends of the respective vertical support frames 70; support wires 50' which connect an installation member 20' provided on an upper end of the vertical rotating shaft 20 to the ends of the blade installation bars 30 so as to support the blade installation bars 30; a blade-spreading-degree control means 90 which is provided under lower surfaces of the blade installation bars 30' so as to control angles at which the rotor blades 60 and 60' spread; a generation efficiency enhancing means 100 which is provided under a central portion of the installation frame 10 to change the number of turbines operating to generate electricity depending on the magnitude of the wind; and a generation means 200 which is provided under a lower end of the vertical rotating shaft 20 so as to generate electricity.

Preferably, an inertial weight is installed on the lower end of the vertical rotating shaft 20 so that the vertical rotating shaft 20 can rotate at a constant speed.

Each rotor blade 60, 60' includes a left blade 60a and a right blade 60b. The left blade 60a includes a left blade shaft 61, a blade perimeter frame 62, a support frame 63, a fabric sheet 64 and a left gear 65 which is provided on an upper end of the left blade shaft 61. The right blade 60b includes a right blade shaft 61', a blade perimeter frame 62', a support frame 63', a fabric sheet 64' and a right gear 65' which is provided on an upper end of the right blade shaft 61'.

Preferably, a vertical blade support rod 67 is installed upright by a bracket 66 which is provided on medial portions of the left and right blade shafts 61 and 61'. A zigzag reinforcing rod 68 is installed between the vertical blade support rod 67 of each rotor blade 60, 60' and the vertical blade support rod 67 of the following rotor blade 60, 60'. Furthermore, it is preferable that each fabric sheet 64, 64' be made of carbon material or FRP material which is not corroded by seawater, given the fact that the present invention may be used as a tidal generator.

A lever 61a is coupled to the left blade shaft 61 of the rotor blade 60. A lever 61a' is coupled to the left blade shaft 61' of the rotor blade 60'. The levers 61a and 61a' are connected to each other by a steel rod 61b so that the rotor blades 60 and 60' which are disposed at positions opposite to each other at 180° can be interlocked with each other in such a way that when the left blade 60a and the right blade 60b of the rotor blade 60 are rotated in unfolding direction, the left blade 60a' and the right blade 60b' of the rotor blade 60' are rotated in folding directions.

The blade-spreading-degree control means 90 includes left and right control pieces 91 and 91' which are rotatably coupled at ends thereof by shafts to a medial portion of the lower surface of each blade installation bar 30, and left and right control pieces 91 and 91' which are rotatably coupled at ends thereof by shafts to a medial portion of the upper surface of each blade installation bar 30'. Gears which engage with each other are disposed under the lower surface of each blade installation bar 30' and are respectively fitted over the shafts of the left and right control pieces 91 and 91'. The blade-spreading-degree control means 90 further includes a sprocket 92 which is installed on an end of the shaft of the left control piece 91, a drive sprocket 93 which is provided under the blade installation bars 30' at a position adjacent to the vertical rotating shaft 20 so as to transmit drive force, a sprocket 94 which is provided to facilitate chain installation, a chain 95 which is wrapped around the sprockets 92 and 94 and the drive sprocket 93, a rotating shaft 96 for the drive sprocket 93, a motor M which drives the drive sprocket 93, and a brush means 97 for supplying power to the motor M.

The degree with which the left and right control pieces 91 and 91' spread is controlled by the operation of the motor M, whereby degrees with which the left and right blades 60$a$ and 60$b$ and the left and right blades 60$a$' and 60$b$' of the rotor blades 60 and 60' spread or fold can be controlled.

The generation efficiency enhancing means 100 includes: an RPM detector which detects the RPM of the vertical rotating shaft 20; a drive gear 102 which is disposed in a housing 101 provided around the lower end of the vertical rotating shaft 20 and is coupled to the lower end of the vertical rotating shaft 20; a first driven gear 103 which engages with the drive gear 102; second and third driven gears 104 and 105 each of which are disposed adjacent to the drive gear 102 and engage with or disengage from the drive gear 102 depending on the intensity of the wind; and an air compressor which pushes at least one or all of the first through third driven gears 103, 104 and 105 to the drive gear 102 using individual linear actuators for the respective driven gears 103, 104 and 105 so that the at least one or all of them engage with the drive gear 102.

The generation means 200 includes generation units 201, 202 and 203 which are respectively coupled to the lower surfaces of the first through third driven gears 103, 104 and 105 which removably engage with the drive gear 102. Each generation unit 201, 202, 203 generates electricity.

Preferably, the rotor blades 60 and 60' comprise rotor blades 60 and 60' stacked in n-stories to form a multi-stacked structure. In addition, it is preferable that a plurality of wind power generators P each of which includes the rotor blades 60 and 60' stacked in n-stories be installed at locations spaced apart from each other with respect to the horizontal direction by predetermined distances. In this case, the generation means of the wind power generators P are electrically connected to each other so that the generation output of the generation means of the wind power generators P can be added up. The total generation output can be markedly increased.

As such, in the case where many wind power generators P, each of which includes the rotor blades 60 and 60' stacked in n-stories, are installed at locations spaced apart from each other with respect to the horizontal direction, as show in FIG. 14, a plurality of support towers X are set up at front, rear, left and right sides of the wind power generators P. The support rings 40 and 40' of the wind power generators P are connected and fastened to the support towers X by wires Y. In this structure, the wind power generators P and the related equipment such as the support towers X and wires Y do not screen the sun. Therefore, the wind power generators P can be installed not only on a place of the ground where there are buildings, but also around farmlands, woods and fields, or ocean culture fields. As such, the present invention is not restricted to an installation locale.

As such, the wind power generators P are supported by the support towers X and the wires Y. Preferably, each wind power generator P is supported using wires by four support towers X. Therefore, even if some of the wind power generators P are damaged by an unexpected accident, e.g. by a hurricane, the other wind power generators P, other than the damaged wind power generators P, are not affected.

Hereinafter, the operation of the variable blade type tidal and wind power generator having enhanced generation efficiency according to the present invention will be explained.

The present invention may be used as a wind power generator or, alternatively, as a tidal power generator. If the generator of the present invention is used as a tidal power generator, the generator is immersed in seawater in such a way that it is turned upside down on the contrary to the orientation of the case where it is used as the wind power generator. Only a separate lifting device is further installed such that the entirety of the generator can be easily immersed into and removed from the sea. As such, the embodiment used as the wind power generator and the embodiment used as the tidal power generator have the same structure. Therefore, for the sake of explanation, the embodiment used as the wind power generator will be representatively explained.

In the wind power generator P according to the present invention, the left blade 60$a$ and the right blade 60$b$ of the rotor blade 60 that face the wind that is moving the generator P are pushed by the wind and are thus spread. The force with which the wind pushes the left blade 60$a$ and the right blade 60$b$ is transmitted to the vertical rotating shaft 20 through the corresponding blade installation bars 30 and 30', whereby the vertical rotating shaft 20 is rotated, thus generating electricity.

At this time, the rotor blade 60' that is disposed at a position opposite to the spread rotor blade 60 at 180° is interlocked with it such that the left blade 60$a$' and the right blade 60$b$' are rotated in directions toward each other. Thus, the rotor blade 60' is folded to an angle in proportion to the degree with which the rotor blade 60 spreads.

Furthermore, depending on the magnitude of the wind, the degree with which the left and right control pieces 91 and 91' spread is adjusted by operating the motor M. Thereby, the range within which the left blade 60$a$ and the right blade 60$b$ can spread, in other words, the range of motion of them, is adjusted, thus controlling the rotating speed of the rotor blade 60. As a result, the generation voltage can be maintained constant.

As stated above, in the present invention, unlike a conventional planar type blade, the rotor blade 60 can effectively receive the wind by adjusting the degree with which the left blade 60$a$ and the right blade 60$b$ are spread. The rotor blade 60 that receives the wind transmits the force generated from the wind to the vertical rotating shaft 20 through the blade installation bars 30 and 30', thus rotating the vertical rotating shaft 20 to generate electricity. By virtue of this structure, the production cost and the weight of equipment can be reduced, and the generation efficiency can be enhanced (by 35% to 40% compared to that of the conventional planar type rotor blade).

Moreover, in the case of a multi-stacked structure, the rotor blades 60 and 60' that form a plurality of stories are arranged in such a way that they are successively misaligned from each other at regular angular intervals with respect to the rotation direction. Therefore, when the rotor blades 60 and 60' of any one group that have been orientated perpendicular to the direction of the wind are rotated by a predetermined angle, the rotor blades 60 and 60' of another group are oriented perpendicular to the direction of the wind. In this way, the rotor blades 60 and 60' of the groups successively enter, by turns, the conditions in which they are oriented perpendicular to the direction of the wind. As a result, generation efficiency can be enhanced.

Such operation of the rotor blades 60 and 60' can be embodied by the structure in which the rotor blade 60 that receives the wind is spread and the rotor blade 60' that is disposed at a position spaced apart from the rotor blade 60 by 180° is folded in proportion to the degree with which the rotor blade 60 is spread.

As the magnitude of the wind increases, the number of generation units that are operated to generate electricity is also increased. For example, when the magnitude of the wind is normal, as shown in FIG. 8A, only the first driven gear 103 engages with the drive gear 102 which is coupled to the vertical rotating shaft 20. In this case, the generation unit 201 which is coupled to the first driven gear 103 generates electricity in response to the rotation of the vertical rotating shaft 20.

While only the generation unit 201 is operated to generate electricity, if the wind speed exceeds a predetermined speed, the air compressor is operated by an RPM detection signal which is sensed by the RPM detector so that the linear actuator that pertains to the second driven gear 104 is operated by the air compressor. Thereby, the second driven gear 104 is pushed to the drive gear 102. Then, the second driven gear 104 also engages with the drive gear 102. As a result, as shown in FIG. 8B, both the first and second driven gears 103 and 104 engage with the drive gear 102, whereby the two generation units 201 and 202 are operated at the same time to generate electricity.

If the magnitude of the wind is further increased, the air compressor is operated by an RPM detection signal which is sensed by the RPM detector, so that both the linear actuators that pertain to the second and third driven gears 104 and 105 are operated by the air compressor. Thus, both the second and third driven gears 104 and 105 are pushed to the drive gear 102. Then, as shown in FIG. 8C, all of the first through third driven gears 103, 104 and 105 engage with the drive gear 102. As a result, the three generation units 201, 202 and 203 are operated at the same time to generate electricity.

In this embodiment, although the three driven gears, that is, the first through third driven gears 103, 104 and 105, have been illustrated as being provided for the sake of explanation, three or more driven gears may be provided.

As shown in FIG. 9, on the assumption that when the rotor blades 60 and 60' of the first group perpendicularly receive the wind, the magnitude of the wind that is applied to the rotor blades 60 and 60' is 100, when the rotor blades 60 and 60' of the first group are rotated by 10° and located at position A, the following rotor blades 60 and 60' are located at position B. Then, the rotor blades 60 and 60' that are located at position A receive the wind with a magnitude obtained by subtracting a magnitude value of the wind that is blocked by the rotor blades 60 and 60' located at position B from a magnitude value derived from cos x (x denotes an angle). The rotor blades 60 and 60' located at position B receive the wind with a magnitude value obtained from sin x (x denotes the angle).

Therefore, the magnitude of the wind that is applied to the rotor blades 60 and 60' located at position B is sin 10°, that is, 17.4. The magnitude of the wind that is applied to the rotor blades 60 and 60' located at position A is cos 10°−17.4, that is, 98.5−17.4=81.1. The energy sum of the rotor blades of the two groups is 98.5, so that an energy loss rate is 1.5 (100−98.5). In this way, the entire energy efficiency and energy loss rate as a function of rotation of the rotor blades 60 and 60' of the two groups becomes as shown in FIG. 10. Thus, it can be understood that the generation efficiency is enhanced.

FIG. 10 illustrates variation in efficiency of the blades of the group A and the group B. This can be tabulated as Table 1.

TABLE 1

Energy efficiency table

| Rotation angle | Blade B | Blade A | Sum of efficiencies of blades A and B | Energy loss rate |
|---|---|---|---|---|
| 0 | 86.4 | 0.0 | 86.4 + 0.0 = 86.4 | 100 − 86.4 = 13.6 |
| 10 | 76.5 | 17.2 | 76.5 + 17.2 = 93.7 | 100 − 93.7 = 6.3 |
| 20 | 64.0 | 34.3 | 64.0 + 34.3 = 98.3 | 100 − 98.3 = 1.7 |
| 30 | 50.0 | 50.0 | 50.0 + 50.0 = 100.0 | 100 − 100 = 0.0 |
| 40 | 34.3 | 64.0 | 34.3 + 64.0 = 98.3 | 100 − 98.3 = 1.7 |
| 50 | 17.2 | 76.5 | 17.2 + 76.5 = 93.7 | 100 − 93.7 = 6.3 |
| 60 | 0.0 | 86.4 | 0.0 + 86.4 = 86.4 | 100 − 86.4 = 13.6 |
| Average | 46.91 | 46.91 | 93.83 | 6.17 |

As can be appreciated from Table 1 and FIG. 10, the energy loss rate is comparatively low, and the energy efficiency is relatively high.

FIG. 11A is a graph showing the generation efficiency of the conventional wind power generator as a function of the wind speed. FIG. 11B is a graph showing the generation efficiency of the tidal and wind power generator according to the present invention as a function of the wind speed.

As shown in FIG. 11A, in the conventional technique, on the assumption that the wind blows at a speed of 6 m/s for 14 hours, wind that is effective for generation is 6×14=84, and wind that is ineffective for generation is 18+98=116. Thus, the efficiency is 84/200=42%. On the other hand, in the present invention, as shown in FIG. 11B, on the assumption that the wind blows at a speed of 4 m/s for four hours, at 8 m/s for four hours, at 12 m/s for four hours and at 16 m/s for four hours, 1) if the wind blows at a speed of 4 m/s for four hours, wind which is effective to operate a single generator is 4×4=16, 2) if the wind blows at a speed of 8 m/s for four hours, wind which is effective to operate two generators is 8×4=32, 3) if the wind blows at a speed of 12 m/s for four hours, wind which is effective to operate three generators is 12×4=48, and 4) if the wind blows at a speed of 12 m/s for four hours, wind which is effective to operate four generators is 16×4=48. Therefore, the entire effective wind amount is 16+32+48+64=160, and the entire ineffective wind amount is 8×5=40. As a result, the efficiency is 160/200=80%.

A test on enhancement of the generation efficiency of the variable blade type tidal and wind power generator according to the present invention was conducted. The test will be explained with reference to FIGS. 12 and 13.

As shown in FIG. 12, a first end of a rope R was connected to the upper end of the vertical rotating shaft 20, and a weight W was connected to a second end of the rope R. Furthermore, as shown in FIG. 13, a side at which the blades are folded was covered with a blocking panel C. In this state, while a fan blew air in the direction of the arrows, the weight of the weight W which was lifted by the rotation of the vertical rotating shaft 20 of the wind power generator was measured.

Furthermore, after the blocking panel C was removed, while the fan blew air in the direction of the arrows, the weight of the weight W which was lifted by the rotation of the vertical rotating shaft 20 of the wind power generator was measured.

As a result, when there was the blocking panel C, the weight of the weight W which was lifted by the rotation of the vertical rotating shaft 20 of the wind power generator was 2.3 kg.

Meanwhile, when wind was applied to the entire area of the wind power generator in the direction of the arrows without the blocking panel C, the weight of the weight W which was lifted by the rotation of the vertical rotating shaft 20 of the wind power generator was 5.3 kg.

The reason for this is interpreted to be because of the fact that wind power which is applied to the blades that are spreading can also be applied by the interlocking means to the blades that are being folded, and wind power which is applied to the blades that are being folded can also be applied by the interlocking means to the blades that are spreading. As such, it can be verified that the generation efficiency of the wind power generator according to the present invention is markedly enhanced.

In the case where the wind power generators P of FIG. 14 each of which includes rotor blades 60 and 60' stacked in n-stories are installed at locations spaced apart from each other with respect to the horizontal direction, as shown in FIG. 15, the vertical support frames 70 and the horizontal support frames 80 (refer to FIG. 3) are removed, and a support unit S is interposed between the upper and lower wind power generators. The perimeter of the support unit S is connected to the corresponding support towers X by wires Y, whereby the wind power generators are supported by the support towers X.

FIG. 16 compares installation conditions of the rotor blades of the wind power generator of the present invention to those of the conventional wind power generator. Neglecting the resistance, the rotating force of the rotor blades is proportional to an area with which they receive the wind. In the present invention shown in FIG. 16, because the wind power generator is configured such that the rotor blades that are spreading are interlocked with the rotor blades that are disposed at positions spaced apart from the rotor blades that are spreading at an angular interval of 180°, the rotor blades can be rotated by the wind with being adapted to the wind. The efficiency of the wind power generator according to the present invention is 80% or more. On the other hand, in the conventional wind power generator, wind power that is applied to a first blade as rotating force is applied as resistance force to a second blade that is spaced apart from the first blade at an angular interval of 120°, whereby the efficiency of the conventional wind power generator is reduced to about 50%.

Furthermore, as shown in FIG. 16, the diameter of the rotor blade of the wind power generator is about 100 m, but in the present invention, it is sufficient that the horizontal length of the rotor blade is about 10 m. In addition, the wind power generators can form a multi-story structure. Therefore, the conventional wind power generator and the wind power generator of the present invention have a ratio of 100:1 in the area of a site where the wind power generator is installed.

Further, in the case of the conventional wind power generator shown in FIG. 16, it is impossible to install separate support equipment. However, in the present invention, as shown in FIG. 14, the wind power generator can be supported using wires Y by the support towers X that are installed around the wind power generator. Moreover, in the present invention, because several wind power generators can form a multi-story structure, a generation efficiency ratio of the wind power generator of the present invention to the conventional wind power generator shown in FIG. 16 is 80:42.

As described above, a variable blade type tidal and wind power generator according to the present invention can be operated even in conditions of gentle winds or low tides regardless of the direction of the wind or the tidal flow. Furthermore, the generator according to the present invention is operated in such a way that rotor blades can collect wind or tidal power. Therefore, the generation efficiency of the generator can be markedly enhanced. Each rotor blade is spread at a side at which it receives the wind or tidal power, and when the rotor blade rotates by 180°, it is folded to minimize air or water resistance when rotating. In this way, resistance force that affects the rotating force of the rotor shaft of the generator can be minimized, whereby the generation efficiency can be further enhanced. In addition, the generator according to the present invention has a simple structure, so that it can be easily manufactured. A plurality of generators according to the present invention can be installed at various places without site limitations, thus making it possible to maximize power production per unit area. Therefore, the present invention can be easily industrialized. Furthermore, the present invention can produce electricity without environmental pollution such as greenhouse gas exhaustion. Even when wind power generators or tidal power generators are configured to have a multi-story structure, they can be stably and reliably installed. As needed, the rotation of the rotor blade may be easily stopped in a simple way, whereby a worker can access a portion of the rotor blade that is required to be repaired, thus facilitating the maintenance. Further, the present invention is configured such that when the rotor blades rotate, the center of resistance force is dispersed. Thus, the generator is formed of light material. As a result, the cost of equipment can be reduced, so that the present invention is economically feasible.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A variable blade type tidal and wind power generator with increased generation efficiency, comprising:
   an installation frame (10) having a '+'-shaped structure and placed on a base surface, with a vertical-rotating-shaft support bracket provided on a central portion of the installation frame (10);
   a vertical rotating shaft (20) rotatably provided upright in the central portion of the installation frame (10);
   a plurality of blade installation bars (30) and (30') crossing upper and lower portions of the vertical rotating shaft (20) in directions perpendicular to the vertical rotating shaft (20), the blade installation bars (30), (30') being spaced apart from each other at regular angular intervals;
   a plurality of support rings (40) and (40') each of which connects ends of the corresponding blade installation bars (30), (30') to each other;
   a plurality of vertical support rods (50) respectively connect the ends of the corresponding upper and lower blade installation bars (30) and (30') to each other;
   a plurality of rotor blades (60) and (60') installed between the blade installation bars (30) and (30') by means of brackets;
   a plurality of vertical support frames (70) installed upright on outer ends of the installation frame (10);
   a plurality of horizontal frames (80) connected to upper ends of the respective vertical support frames (70);
   a support wire (50') connecting an installation member (20') provided on an upper end of the vertical rotating shaft (20) to the ends of the blade installation bars (30) so as to support the blade installation bars (30);
   a blade-spreading-degree control means (90) provided under lower surfaces of the blade installation bars (30'), the blade-spreading-degree control means (90) controlling angles at which the rotor blades (60) and (60') spread;
   a generation efficiency enhancing means (100) provided under a central portion of the installation frame (10), the generation efficiency enhancing means (100) for changing the number of turbines operating to generate electricity depending on a magnitude of wind; and a generation means (200) provided under a lower end of the vertical rotating shaft (20), the generation means (200) for generating electricity.

2. The variable blade type tidal and wind power generator as set forth in claim 1, wherein an inertial weight is installed on the lower end of the vertical rotating shaft (20).

3. The variable blade type tidal and wind power generator as set forth in claim 1, wherein each of the rotor blades (60) and (60') comprises:
- a left blade (60*a*) comprising a left blade shaft (61), a blade perimeter frame (62), a support frame (63), a fabric sheet (64), and a left gear (65) provided on an upper end of the left blade shaft (61); and
- a right blade (60*b*) comprising a right blade shaft (61'), a blade perimeter frame (62'), a support frame (63'), a fabric sheet (64'), and a right gear (65') provided on an upper end of the right blade shaft (61').

4. The variable blade type tidal and wind power generator as set forth in claim 3, wherein the rotor blades (60) and (60') comprise rotor blades (60) and (60') stacked in n-stories to form a multi-stacked structure, and a plurality of wind power generators (P) each of which comprises the rotor blades (60) and (60') stacked in n-stories are installed at locations spaced apart from each other with respect to a horizontal direction by predetermined distances, wherein the generation means of the wind power generators (P) are electrically connected to each other so that generation output of the generation means of the wind power generators (P) is added up.

5. The variable blade type tidal and wind power generator as set forth in claim 3, wherein a vertical blade support rod (67) is installed upright by a bracket (66) provided on medial portions of the left and right blade shafts (61) and (61'), and a zigzag reinforcing rod (68) is installed between the vertical blade support rod (67) of each of the rotor blades (60), (60') and the vertical blade support rod (67) of the following rotor blade (60), (60').

6. The variable blade type tidal and wind power generator as set forth in claim 3, wherein each of the fabric sheets (64) and (64') is made of carbon material or FRP (fiber reinforced plastic) material.

7. The variable blade type tidal and wind power generator as set forth in claim 3, wherein a lever (61*a*) is coupled to the left blade shaft (61) of the rotor blade (60), and a lever (61*a*') is coupled to the left blade shaft (61') of the rotor blade (60'), wherein the levers (61*a*) and (61*a*') are connected to each other by a steel rod (61*b*) so that the rotor blades (60) and (60') that are disposed at positions opposite to each other at 180° are interlocked with each other in such a way that when the left blade (60*a*) and the right blade (60*b*) of the rotor blade (60) are spread, the left blade (60*a*') and the right blade (60*b*') of the rotor blade (60') are folded.

8. The variable blade type tidal and wind power generator as set forth in claim 1, wherein the blade-spreading-degree control means (90) comprises:
- left and right control pieces (91) and (91') rotatably coupled at ends thereof by shafts to a medial portion of a lower surface of each of the blade installation bars (30);
- left and right control pieces (91) and (91') rotatably coupled at ends thereof by shafts to a medial portion of an upper surface of each of the blade installation bars (30');
- gears disposed under a lower surface of each of the blade installation bars (30') and respectively provided on the shafts of the left and right control pieces (91) and (91'), the gears engaging with each other;
- a sprocket (92) installed on an end of the shaft of the left control piece (91);
- a drive sprocket (93) provided under the lower surface of the blade installation bars (30') at a position adjacent to the vertical rotating shaft (20), the drive sprocket (93) being provided to transmit drive force;
- a sprocket (94) provided to facilitate installation of a chain;
- a chain (95) wrapped around the sprockets (92) and (94) and the drive sprocket (93);
- a rotating shaft (96) for the drive sprocket (93);
- a motor (M) provided to drive the drive sprocket (93); and
- a brush means (97) for supplying power to the motor (M).

9. The variable blade type tidal and wind power generator as set forth in claim 1, wherein the generation efficiency enhancing means (100) comprises:
- an RPM detector for detecting an RPM of the vertical rotating shaft (20);
- a drive gear (102) disposed in a housing (101) provided around the lower end of the vertical rotating shaft (20), the drive gear (102) being coupled to the lower end of the vertical rotating shaft (20);
- a first driven gear (103) engaging with the drive gear (102);
- second and third driven gears (104) and (105) each of which are disposed adjacent to the drive gear (102) and engage with or disengage from the drive gear (102) depending on the magnitude of the wind; and
- an air compressor pushing at least one of the first through third driven gears (103), (104) and (105) to the drive gear (102) using individual linear actuators for the respective driven gears (103), (104) and (105) so that the at least one of the respective driven gears (103), (104) and (105) engages with the drive gear (102).

10. The variable blade type tidal and wind power generator as set forth in claim 1, wherein the generation means (200) comprises
- generation units (201), (202) and (203) respectively coupled to lower surfaces of the first through third driven gears (103), (104) and (105) which removably engage with the drive gear (102), each of the generation units (201), (202) and (203) generating electricity.

\* \* \* \* \*